Patented Sept. 7, 1943

2,328,570

UNITED STATES PATENT OFFICE 2,328,570

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application August 16, 1938, Serial No. 225,198

12 Claims. (Cl. 260—196)

This invention relates to aromatic azo compounds and their application to the art of dyeing or coloring. More particularly, it relates to aromatic azo compounds containing a phosphoric or a thiophosphoric acid ester group attached to an aliphatic, cycloalkyl, aryl or hydroaryl radical which is joined to an aryl nucleus of the benzene or naphthalene series through a nitrogen atom which is a nuclear substituent of the aryl nucleus and the application of the nuclear non-sulfonated aromatic azo compounds to the dyeing or coloration of organic derivatives of cellulose.

Organic derivatives of cellulose are characterized by an indifferent affinity for the usual cotton or wool dyes, especially the ordinary water soluble dyes. This fact has largely necessitated the development of new dyes particularly adapted for the coloration of organic derivatives of cellulose. The new substantive dyes, developed in this connection, however, have almost without exception, been water-insoluble or so water-insoluble that they are applied to the material undergoing coloration with the aid of solubilizing or dispersing agents. Our invention has as an object the elimination of the need of the customary solubilizing or dispersing treatment by providing water-soluble aromatic azo dyes suitable for the coloration of material made of or containing an organic derivative of cellulose.

A further object is to provide a process for coloring organic derivatives of cellulose wherein a water-soluble dye is added to an aqueous dyebath and applied directly to the coloration of the material.

A still further object is to provide colored materials made of or containing an organic derivative of cellulose which are of good fastness to light and washing.

In order that the expression "organic derivatives of cellulose" may be clearly understood, it should be noted that typical organic derivatives of cellulose include the hydrolyzed as well as the unhydrolyzed organic acid esters of cellulose, such as cellulose acetate, cellulose formate, cellulose propionate or cellulose butyrate, and the hydrolyzed as well as the unhydrolyzed mixed organic acid esters of cellulose such as cellulose acetate-propionate, cellulose acetate-butyrate and the cellulose ethers, such as methyl cellulose, ethyl cellulose or benzyl cellulose.

The azo compounds of our invention are not restricted in their application to the coloration of organic derivatives of cellulose but likewise find application for the dyeing or coloration of wool and silk. For the coloration of these latter materials, sulfonated or unsulfonated azo dye compounds may be employed. As previously indicated, however, nuclear sulfonated compounds have not been found to be satisfactory for the coloration of organic derivatives of cellulose.

Because the compounds of our invention possess affinity for organic derivatives of cellulose, as well as wool and silk, they are of use for the union dyeing of materials, particularly textile materials or fabrics, containing an organic derivative of cellulose, cellulose acetate, for example, and a textile material such as wool or silk. These materials may be present in various combinations and proportions. To illustrate, a wool and cellulose acetate silk fabric or a wool, silk and cellulose acetate silk fabric, for example, may be dyed. Similarly, a wool and silk fabric may be union dyed.

Further, it will be understood that one or more dyes may be employed in the union dyeing operation. To illustrate, if a textile material composed of wool and cellulose acetate is being dyed, a nuclear non-sulfonated dye alone, a mixture of nuclear non-sulfonated dyes, or a mixture of a nuclear non-sulfonated and a nuclear sulfonated dye may be employed. Where the textile material contains an organic derivative of cellulose, a nuclear sulfonated dye alone cannot be employed for the union dyeing since such dyes have little or no affinity for organic derivatives of cellulose. Again, as well known in the art, where an organic derivative of cellulose alone, such as cellulose acetate, is being dyed, a mixture of nuclear non-sulfonated dyes may be used.

A further object of our invention, accordingly, is to provide a process for the union dyeing of textile materials containing admixtures of any two of the textile materials, wool, silk and an organic derivative of cellulose.

The aromatic azo compounds of our invention, as above indicated, are characterized in that they contain a phosphoric or a thiophosphoric acid ester group attached to an aliphatic, cycloalkyl, aryl or hydroaryl radical which is joined to an aromatic nucleus through a nitrogen atom which is a nuclear substituent of the aromatic nucleus. By "a phosphoric acid ester group" we include the phosphoric acid group in its free acid,

or salt form, such as

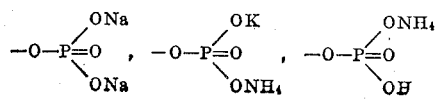

for example, as well as substituted phosphoric acid groups such as

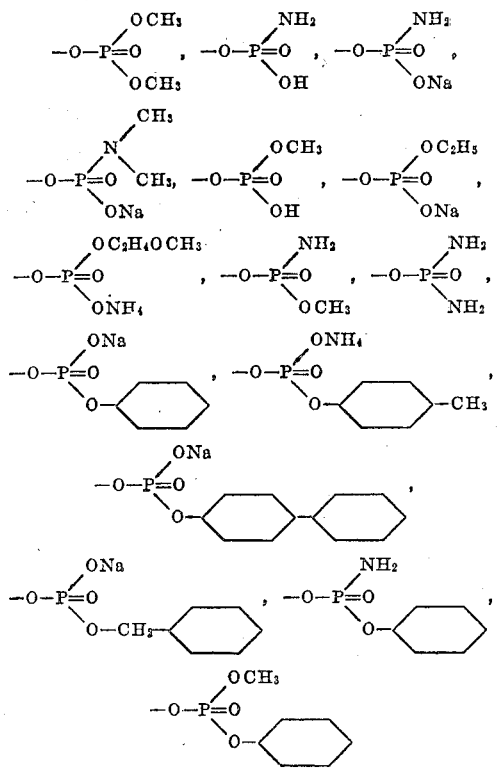

and

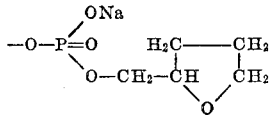

for example.

Similarly, by "a thiophosphoric acid ester group" we include the thiophosphoric acid group in its free acid,

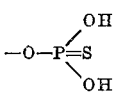

or salt form, such as

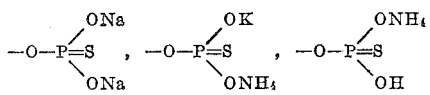

for example, as well as substituted thiophosphoric acid groups such as

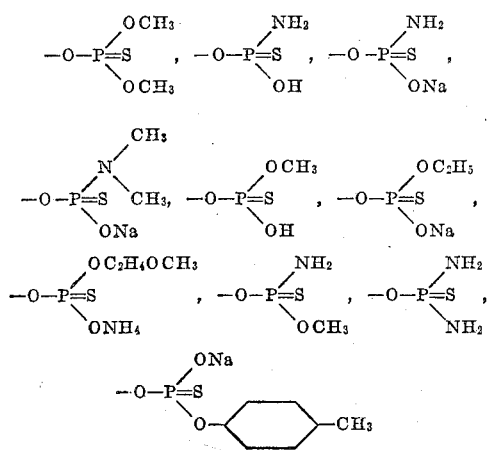

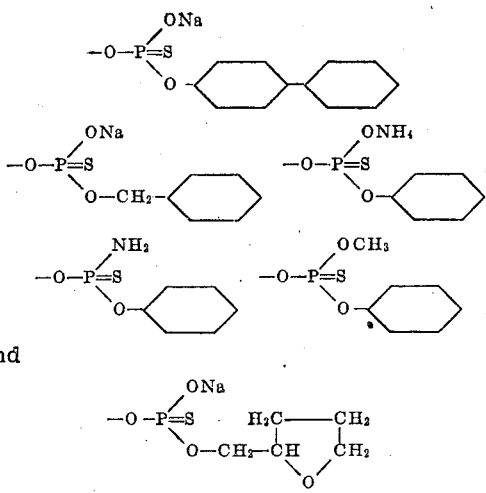

and

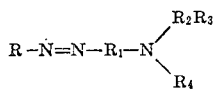

for example.

While it is difficult to represent the aromatic azo compounds of our invention by a general formula, they have, for the most part, the general formula:

$$R-N=N-R_1-N\begin{matrix}R_2R_3\\R_4\end{matrix}$$

wherein R represents the residue of an aromatic diazo component, $R_1$ represents the residue of an aryl nucleus of the benzene or naphthalene series, $R_2$ represents an aliphatic radical containing at least two carbon atoms, a cycloalkyl group, an aryl group or a hydroaryl radical, $R_3$ represents a phosphoric acid ester or a thiophosphoric acid ester group and $R_4$ represents hydrogen, an aliphatic group, an aryl group, an aralkyl group, a cycloalkyl group, or an $R_2R_3$ group, wherein $R_2$ and $R_3$ have the meaning previously assigned to them. The substituted amino group containing the phosphoric acid ester or thiophosphoric acid ester group is normally in the para position to the azo bond.

It should be noted that while our invention is concerned primarily with monoazo dye compounds polyazo compounds are likewise included within the scope of our invention as will be more fully apparent hereinafter. The letter R in the above general formula therefore will be understood to include aromatic components containing an azo bond.

The term "an aliphatic radical" or "an aliphatic group" includes unsubstituted alkyl groups such as methyl, ethyl, a propyl or a butyl group and substituted alkyl groups, such as, for example, alkyl radicals substituted by OH— groups, such as hydroxyethyl, β-hydroxypropyl, γ-hydroxypropyl, β,γ-hydroxypropyl or a hydroxybutyl group, alkyl radicals substituted by halogen, such as, for example, chloro-, bromo-, or iodo-ethyl radicals and alkyl radicals substituted with an alkoxy group, such as, for example, β-methoxyethyl (—$C_2H_4$—O—$CH_3$), β-ethoxyethyl (—$C_2H_4$—O—$C_2H_5$) or γ-methoxypropyl (—$CH_2CH_2CH_2$—O—$CH_3$). The term "an aliphatic radical" or "an aliphatic group" further includes unsaturated hydrocarbon radicals, such as the allyl radical ($CH_2$=CH—$CH_2$—) or alkylene radicals such as, —CH=$CH_2$, or —CH=C=$CH_2$, for example.

While our invention in its broader aspects includes the compounds represented by the above general formula, it relates more particularly to monoazo compounds wherein R and R₁ each represents an aryl nucleus of the benzene series containing but one benzene nucleus, R₂ represents an aliphatic radical containing at least two carbon atoms, and in general a saturated straight chain hydrocarbon of the general formula $C_nH_{2n}$ wherein $n$ is a small whole number greater than 1 and R₄ represents an aliphatic radical.

For the dyeing of organic derivatives of cellulose, such as cellulose acetate silk, we have found that the nuclear unsolfonated monoazo compounds, devoid of a carboxylic acid group, wherein R and R₁ each represents an aryl nucleus of the benzene series containing but one benzene nucleus, R₂ represents an aliphatic radical containing at least two carbon atoms, and R₄ represents an aliphatic radical are generally advantageous. Again, generally speaking, such compounds wherein R₂ is a saturated straight chain hydrocarbon of the general formula $C_nH_{2n}$, wherein $n$ is a small whole number greater than 1, are advantageous for the dyeing of organic derivatives of cellulose. It will be appreciated, however, that there may be some exceptions to the general rule just set forth. Further, it is to be clearly understood that the above is not intended to be interpreted as meaning that compounds included within the scope of our invention but falling without the above definition are not suitable for the dyeing of organic derivatives of cellulose. In this connection we have further noted that compounds wherein R is as just defined but in which R₁ is a naphthalene nucleus often yield dyeings on organic derivatives of cellulose which are satisfactory as regards color but these dyeings are ordinarily not nearly as light fast as those compounds wherein R₁ is an aryl nucleus of the benzene series.

The aromatic azo compounds of our invention may be prepared in a number of ways. They can be prepared, for example, by coupling an aromatic diazonium compound with a coupling component having the general formula

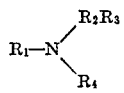

wherein R₁, R₂, R₃ and R₄ have the meaning previously assigned to them. Another way in which they can be prepared is by subjecting an azo compound having the general formula:

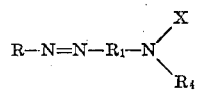

wherein R and R₁ have the meaning previously assigned to them, X represents a hydroxyalkyl group, a hydroxycycloalkyl group, a hydroxyaryl group or a hydroxyhydroaryl group and R₄ represents hydrogen, an aliphatic group, an aryl group, an aralkyl group, a cycloalkyl group or X, to treatment with a phosphating agent. In this phosphating treatment a hydroxy group of the hydroxyalkyl, cycloalkyl, aryl or hydroaryl group undergoes reaction with the phosphating agent and a phosphoric acid ester or a thiophosphoric acid ester group replaces the hydrogen atom of a hydroxy group. Where R₄ is X, the phosphating treatment may be conducted so as to incorporate only one phosphoric or thiophosphoric acid ester group in the dye molecule or to incorporate, for example, two such groups in the dye molecule. In those instances where X contains more than one hydroxy group, one or more of said hydroxy groups may have the hydrogen atom replaced with a phosphoric or a thiophosphoric acid ester group. Normally the dye compounds of our invention contain but one phosphoric or thiophosphoric acid ester group. The preparation of the azo dye compounds of the invention and of various intermediate compounds which can be employed in their preparation will be clear from the examples and descriptive matter which follows.

The dye compounds of our invention possess a a wide range of solubility in water, varying from those practically insoluble or relatively insoluble to those having a relatively high solubility in water. Many of the compounds are sufficiently water-soluble that they may be applied directly from an aqueous solution to the material being dyed or colored without the use of a dispersing or solubilizing agent. It should be noted, however, that those compounds having a relatively high water-solubility have less affinity for organic derivatives of cellulose than those not having such a relatively high water-solubility. While it is difficult to set forth a generalization in this connection, we have observed that the dyes having a solubility in water exceeding about 1% (by weight) generally do not have as good an affinity as those having a solubility in water less than about 1%.

The water solubility of the azo dye compounds of our invention, as will be readily understood, is dependent on a variety of factors. The presence of salt forming atoms or radicals, such as Na, K or NH₄, increases the solubility of the compounds. To illustrate, compounds wherein one or more of the hydrogen atoms of the phosphoric acid ester of thiophosphoric acid ester group are replaced by an alkali metal such as sodium or potassium or the ammonium radical are more water-soluble than the corresponding compounds wherein the hydrogen atoms are not replaced or are replaced, for example, with an alkyl or an aryl radical. Similarly, in the case of compounds wherein the phosphoric acid ester or thiophosphoric acid ester group is attached to the nitrogen atom through an aliphatic radical, the solubility generally decreases with increase in the number of carbon atoms in the aliphatic radical. To illustrate, compounds wherein the alpihatic radical is an alkyl radical, such as a butyl radical, are less soluble than the corresponding compounds wherein the aliphatic radical is an alkyl radical such as ethyl. It will be understood, of course, that the remarks just made with respect to water solubility are merely illustrative and are not intended to be exhaustive. From the foregoing, however, the manner of varying the solubility of the compounds should be readily apparent.

Generally speaking, compounds wherein not more than one of the hydrogen atoms of the phosphoric acid ester or thiophosphoric acid ester group is replaced with a salt forming atom or radical imparting water solubility are better adapted for the dyeing or coloring of organic derivatives of cellulose, such as cellulose acetate, than those which contain more than one such salt forming atom or radical.

As previously indicated, any suitable aromatic diazonium compound may be employed in the preparation of the azo compounds of our invention. Primary aromatic amines which may be diazotized in known fashion to yield the corresponding diazonium compounds include aniline, aniline substituted in the nucleus with a halogen atom, such as chlorine, bromine, or iodine, a nitro group, an unsubstituted alkyl group, such as methyl, ethyl, propyl or butyl, a substituted alkyl group such as hydroxyethyl, β-hydroxypropyl, γ-hydroxypropyl, β-methoxyethyl or β-ethoxyethyl, a cyano group, a hydroxy group, or an alkyl keto group such as

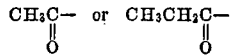

a phenylene diamine, an aryl amino compound containing two or more aryl residues linked in any desired manner, for example, directly as in benzidine, 2:2' or 3:3'-dinitrobenzidine, or 5-nitro ortho tolidine, by means of an atom of oxygen as for example in 3-nitro-4-amino-diphenyl ether, by means of an atom of sulfur as for example in 4-amino-4'-nitro diphenyl sulfide and 4:4'-diamino-3:3'-dinitro diphenyl sulfone, by means of an atom of nitrogen as in 2:4-dinitro-3'-amino diphenylamine, 2:4-dinitro-4'-aminodiphenyl amine or by means of an atom of carbon as for example in 5-nitro-2-aminobenzophenone, 3-nitro-4-aminobenzophenone, or 3:5-dinitro-4-aminobenzophenone. Further, a substituted or unsubstituted naphthylamine, such as α-naphthylamine, 1-amino-2-sulfonic naphthalene, 1-amino-4-hydroxy naphthalene, and 1-amino-2-naphthol-4-sulfonic acid may be employed. Similarly, an aminobenzothiazole such as 6-methoxy-2-aminobenzothiazole,

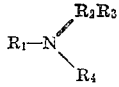

or 2-aminobenzothiazole and an aminothiazole such as 2-aminothiazole may be employed. Further, any of the primary amines disclosed in our United States Letters Patents 2,107,898 and 2,108,824, issued February 8, 1938, and February 22, 1938, respectively, for example, may likewise be diazotized in the manner indicated therein and the diazonium compounds obtained coupled with any of the coupling components disclosed or indicated herein to yield compounds included within the scope of our present invention.

Any compound having the general formula:

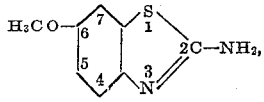

wherein $R_1$, $R_2$, $R_3$ and $R_4$ have the meaning previously assigned to them and which has a free coupling position, may be coupled with an aromatic diazonium compound to yield azo compounds included within the scope of our invention. A number of phosphoric acid ester coupling compounds having the general formula just given by way of example but they are not intended to be limitative of the invention.

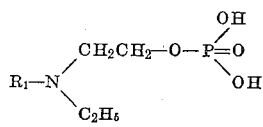

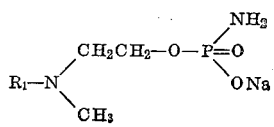

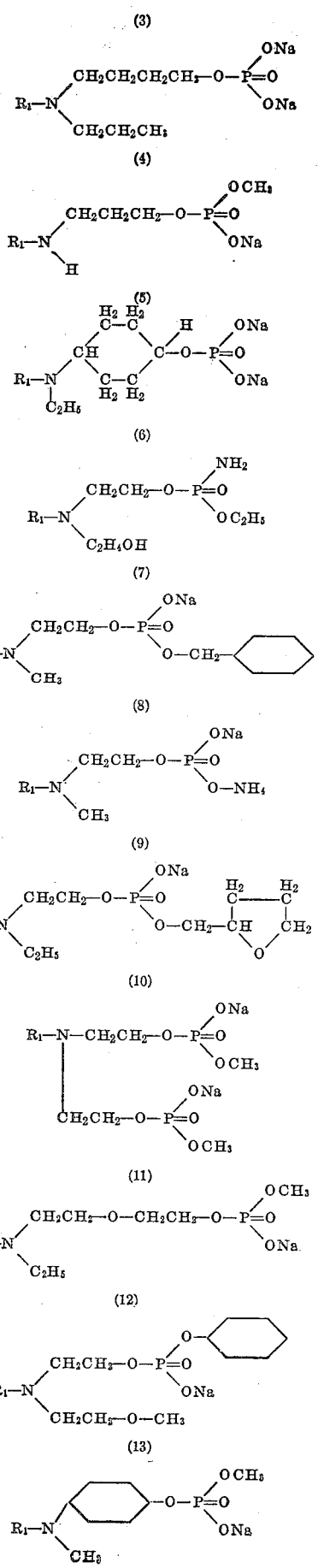

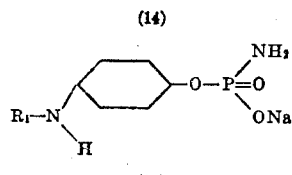

(14)

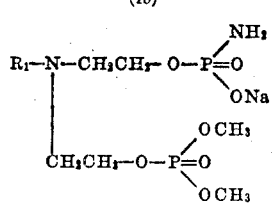

(15)

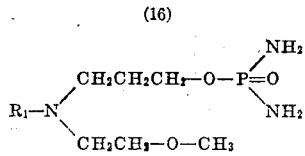

(16)

R₁, in the above formulae, represents the residue of an aryl nucleus of the benzene or naphthalene series, which may be substituted or unsubstituted. R₁ may be substituted, for example, with a nitro group, a halogen atom such as chlorine, bromine or iodine, an alkyl group such as methyl, ethyl, propyl or butyl, the term alkyl group likewise including substituted alkyl groups such as, for example, alkyl radicals substituted by —OH, such as hydroxyethyl, β-hydroxypropyl, γ-hydroxypropyl, β-γ-hydroxypropyl or a hydroxybutyl group, alkyl radicals substituted by halogen, such as, for example, chloro-, bromo- or iodo-ethyl radicals, alkyl radicals substituted with an alkoxy group, such as, for example, β-methoxyethyl, β-ethoxyethyl or γ-methoxypropyl, an alkoxy group such as methoxy, ethoxy or propoxy, an alkoxy-alkoxy group such as methoxy-methyoxy, β-methoxy-ethoxy or β-ethoxy-ethoxy, a hydroxy group and a carboxyl group.

Thiophosphoric acid ester coupling compounds corresponding to the above phosphoric acid ester coupling compounds can be prepared and are illustrative of the coupling compounds which may be employed in the preparation of the azo compounds of our invention.

The following examples illustrate the preparation of the azo compounds of our invention:

Example 1

13.8 grams of p-nitroaniline are added to 200 cc. of water containing 40 cc. of 36% hydrochloric acid. The resulting mixture is cooled, by the addition of ice, for example, to a temperature approximating 0–5° C. and the amine is diazotized while maintaining this temperature by adding, with stirring, a water solution of 6.9 grams of sodium nitrite.

30.9 grams of

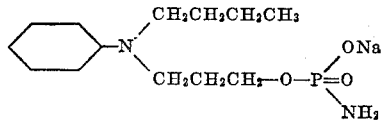

are dissolved in water. The resulting solution is cooled to a temperature approximating 0–10° C. by the addition of ice and the diazo solution formed above is slowly added with stirring. Concurrently with the addition of the diazo solution, sodium bicarbonate is added, in the form of a water solution, for example, at such a rate that the reaction mixture is maintained practically neutral to limits. Upon completion of the coupling reaction which takes place, the dye compound formed is precipitated by the addition of sodium chloride, recovered by filtration, washed with water and dried. The dye compound formed has the formula:

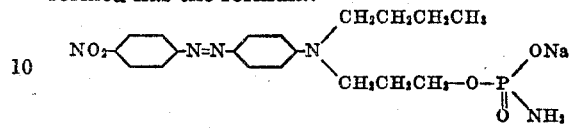

and colors cellulose acetate silk a red shade of good fastness to light and washing. Wool and silk likewise are dyed red shades by this dye compound.

Example 2

17.3 grams of 1-amino-2-chloro-4-nitrobenzene are diazotized and the diazonium compound formed is coupled with 38.1 grams of amyl-Δ-diammoniumphosphobutyl - m-chloroaniline. The diazotization, coupling and dye recovery operations may be carried out in accordance with the general method described in Example 1. The dye compound obtained has the formula:

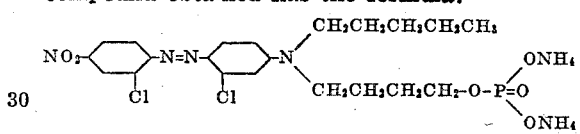

and colors cellulose acetate silk a brick-red shade of good fastness to light and washing.

29.7 grams of

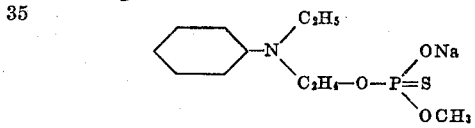

can be substituted for amyl-Δ-diammoniumphosphobutyl-m-chloroaniline in the above example to obtain

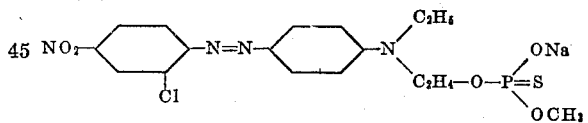

which colors cellulose acetate a reddish shade of good fastness to light and washing.

Example 3

26.2 grams of 2,4-dinitro-6-bromoaniline are diazotized and the diazonium compound formed is coupled with 35.3 grams of propyl-β-disodiumphosphoethyl-α-naphthylamine. Upon completion of the coupling reaction, the dye compound formed is precipitated by the addition of sodium chloride, recovered by filtration, washed with water and dried. The dye compound obtained has the formula:

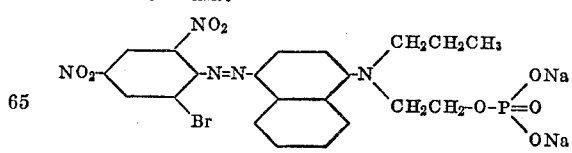

and colors cellulose acetate silk a blue shade.

Example 4

(A) 24.2 grams of cetyl alcohol (C₁₅H₃₁CH₂OH)

are dissolved in 150 cc. of dry pyridine and treated in the cold with 15.4 grams of phosphorous oxychloride.

(B) 22.5 grams of 3-methyl-6-methoxy-di-β-hydroxyethylaniline are dissolved in pyridine and the ester prepared as described in A is added, with stirring, at 0° C. The reaction which takes place is completed by allowing the reaction mixture to warm to room temperature. The reaction product resulting is then hydrolyzed with sodium hydroxide to obtain

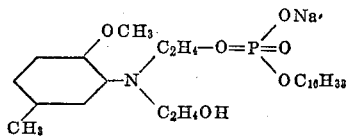

(C) 37.6 grams of

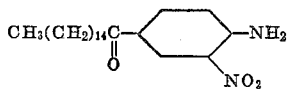

are diazotized and the diazonium compound resulting is coupled with the phosphate compound prepared in B above. The recovered dye compound has the formula:

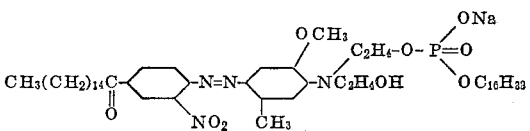

and yields dyeings of a rubine shade.

The above dye compound is obtained in the form of its sodium salt. If any other salt is desired, it can be obtained by treatment with a mineral acid followed by treatment with the desired inorganic or organic base such as lime, piperidine or ethanolamine, for example.

*Example 5*

13.8 grams of

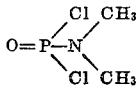

in pyridine are added to a cold dimethylaniline solution of 22.7 grams of γ-hydroxypropyldiphenylamine. The reaction is completed by allowing the reaction mixture to warm to room temperature. The compound formed is separated from the reaction mixture and hydrolyzed with sodium hydroxide to obtain

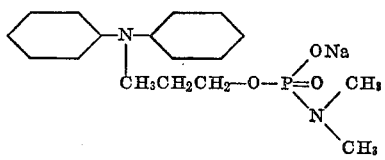

21.6 grams of 3-nitro-6-aminophenylmethylsulphone are diazotized and coupled with the compound formed above. The coupling and dye recovery operations may be carried out in accordance with the general method set forth in Example 1. The dye compound obtained has the formula:

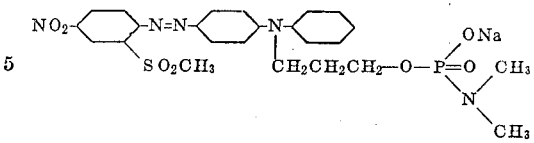

and colors cellulose acetate silk a rubine shade.

*Example 6*

27.7 grams of 3-methoxy-6-methylcyclohexyl-γ-hydroxypropylaniline are dissolved in carbon tetrachloride and heated to boiling with 10 grams of phosphoric acid. When no more water is evolved, the carbon tetrachloride is removed and the reaction product obtained is dissolved in water.

19.8 grams of 1-amino-2-nitro-4-β-hydroxyethoxybenzene are diazotized and the diazonium compound formed is coupled with the compound formed above. The dye compound obtained has the probable formula:

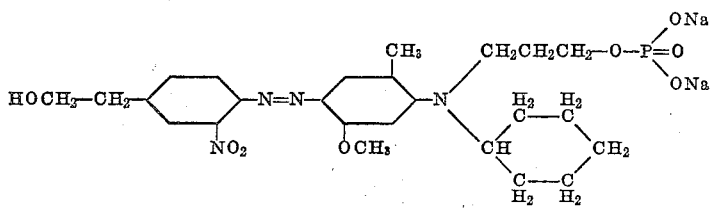

and yields dyeings of a red shade. It will be understood, of course, that any desired mono- or di- salt may be prepared instead of the disodium salt form shown. To illustrate, the monoammonium, diammonium or dipotassium salt forms can be readily prepared in known manner. Again, the dye compound may be prepared in its free acid form in known fashion.

*Example 7*

19.5 grams of β-hydroxyethyl-γ-hydroxypropylaniline are dissolved in carbon tetrachloride and heated to boiling with 28.41 grams of phosphoric anhydride. When no more water is evolved, the carbon tetrachloride is removed and the reaction product obtained is dissolved in water, filtered, and the purified product obtained by evaporation.

23 grams of 1-amino-2-phenyl-4-chlorobenzene are diazotized and the diazonium compound formed is coupled with the phosphoric ester compound formed above. The recovered dye compound has the probable formula:

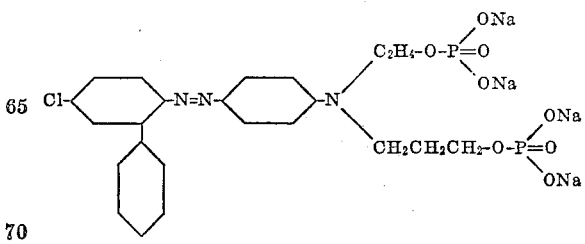

and colors wool a yellowish-orange shade.

Example 8

42.7 grams of

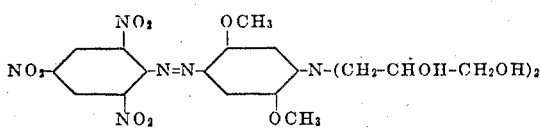

are dissolved in pyridine and treated in the cold with 21.1 grams of phenylphosphorylchloride,

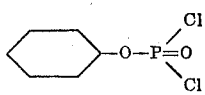

The reaction product obtained is then hydrolyzed by heating with aqueous potassium hydroxide. The dye compound formed upon hydrolysis is dissolved in water, precipitated by the addition of sodium chloride, recovered by filtration, washed with water and dried. A

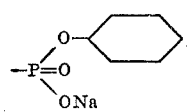

grouping replaces at least one of the hydrogen atoms of the hydroxy groups of the glyceryl radicals but the exact formula of the compound formed is not known. If desired, 42.2 grams of phenylphosphorylchloride may be employed in the reaction in which case at least two hydrogens of the hydroxy groups of the glyceryl radicals will be replaced by the

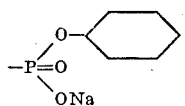

grouping. The dye compounds obtained color cellulose acetate a blue shade.

Example 9

26.2 grams of p-aminobenzeneazo-α-naphthylamine are placed in 200 cc. of water to which has been added 80 cc. of 36% hydrochloric acid and diazotized at 20° C. by the addition of a water solution of 13.8 grams of sodium nitrite.

76 grams of

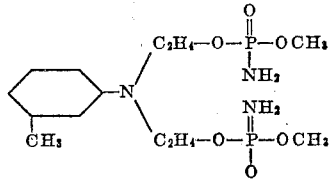

are dissolved in glacial acetic acid and coupled with the diazonium compound prepared above. The recovered dye compound has the formula:

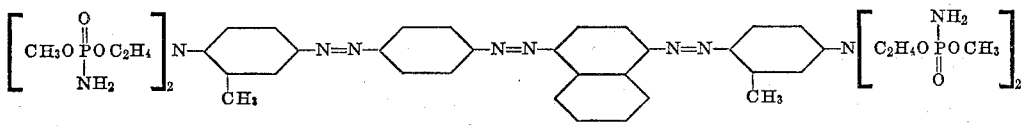

Example 10

39.3 grams of p-nitro-o-bromobenzeneazoethyl-β-hydroxyethylaniline are dissolved in 450 cc. of a dry mixture of dioxane and pyridine (half and half) and the resulting mixture is added dropwise to a well stirred solution of 21.1 grams of monophenylphosphorylchloride in 400 cc. of a dry 50–50 pyridine-dioxane mixture at 50–60° C. About 30 minutes is required for the addition of the dye and following its addition the mixture is heated and maintained at a temperature of 60–65° C. for six hours. An aqueous solution containing 200 grams of sodium carbonate is then added and the resulting mixture stirred for one hour. The reaction mixture resulting is evaporated to dryness on a steam bath and the residue remaining is dissolved in water at 60–70° C., filtered and the filtrate evaporated to dryness under reduced pressure. The dye compound may be recovered by extraction from the residue by a suitable solvent or the residue may be dissolved in water and the dye precipitated out by the addition of sodium chloride and recovered by filtration. The dye compound obtained has the formula:

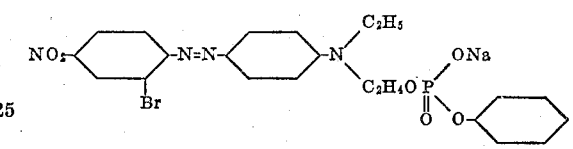

and colors cellulose acetate a rubine shade.

Example 11

42.3 grams of 2,4-dinitro-6-chlorobenzeneazo-di-β-hydroxyethyl-m-toluidine are dissolved in 600 cc. of dry pyridine and the resulting solution is added dropwise with stirring to 16 grams of dimethoxyphosphorylchloride in 700 cc. of dry pyridine at 50° C. over a period of one hour. Following the addition of the above dye compound, stirring is continued at 50–65° C. for six hours and then any acid present is neutralized by the addition of sodium carbonate. Pyridine is removed from the reaction mixture by distillation under reduced pressure following which the dye compound present in the residue remaining from the distillation is recovered by extraction with acetone from which it may be freed by distillation under reduced pressure. The dye compound obtained has the formula:

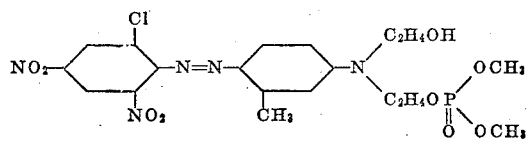

and colors cellulose acetate silk a violet shade.

Example 12

36.9 grams of p-acetobenzeneazoethyl-γ-hydroxypropyl cresidine are dissolved in chloroform and treated at room temperature with 10.64 grams of phosphorus sulfochloride. The reaction is completed by warming. The reaction product resulting is hydrolyzed by treatment with 16.8 grams of sodium bicarbonate following which the chloroform is removed. The dye compound remaining is dissolved in hot water, filtered, precipitated by the addition of sodium chloride, again filtered, and dried. The dye compound obtained has the formula:

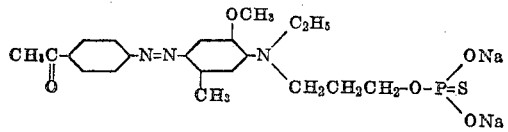

The following tabulation further illustrates the compounds of our invention together with the color they produce on cellulose acetate silk. The compounds indicated below may be prepared by diazotizing the amines listed under the heading "Amine" and coupling the diazonium compounds formed with the compounds specified in the column entitled "Coupling component."

| Amine | Coupling component | Color on cellulose acetate silk |
|---|---|---|
| o-Chloroaniline | (1) [structure] | Orange-yellow. |
| Do | (2) [structure] | Yellow. |
| Do | (3) [structure] | Do. |
| Do | (4) [structure] | Do. |
| Do | (5) [structure] | Do. |
| Do | (6) [structure] | Do. |
| Do | (7) [structure] | Red. |
| Do | (8) [structure] | Do. |
| Do | (9) [structure] | Do. |
| p-Bromoaniline | 1–6 above | Orange-yellow. |
| | 7–9 above | Red. |
| 2,4,6-trinitroaniline | 1 above | Blue. |
| | 2–6 above | Purple. |
| | 7–9 above | Blue. |
| p-Nitroaniline | 1 above | Rubine. |
| | 2–6 above | Red. |
| | 7–9 above | Purplish-red. |
| p-Nitro-o-(F, Cl, Br, I) aniline | 1–6 above | Rubine. |
| | 7–9 above | Purplish-red. |
| p-Aminoacetophenone | 1 above | Orange-red. |
| | 2–6 above | Orange. |
| | 7–9 above | Red. |

Following is an additional number of dyes which may be prepared after the general methods described above together with the color they yield on cellulose acetate, silk and wool.
| Dye | Color on cellulose acetate, silk and wool |
|---|---|
| 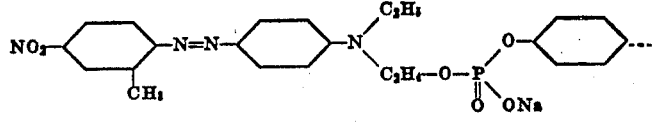 | Orange. |
| 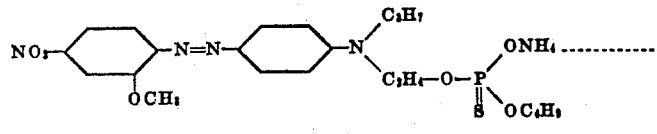 | Red. |
| 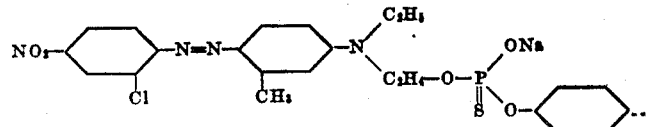 | Rubine. |
| 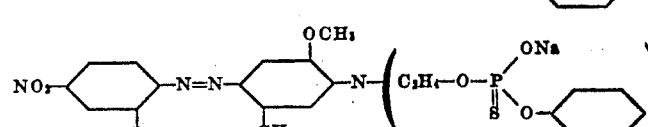 | Wine. |
| 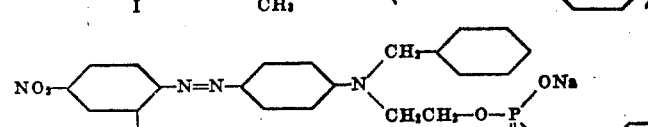 | Red. |
| 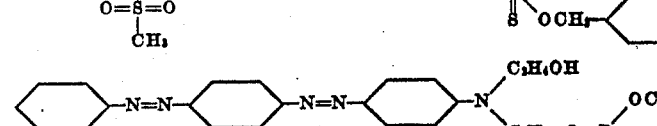 | Orange. |
| 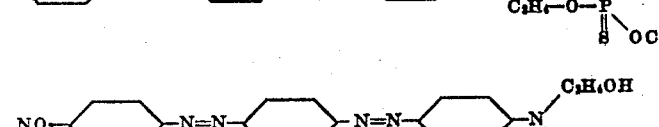 | Rubine. |
| 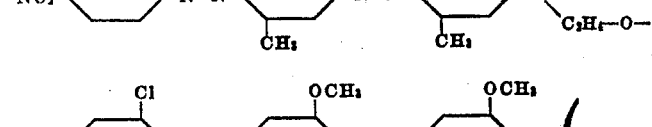 | Purple. |
| 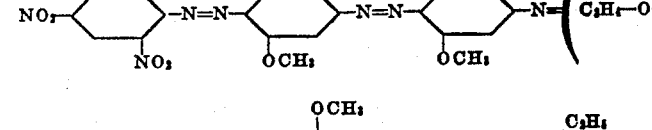 | Blue. |
| 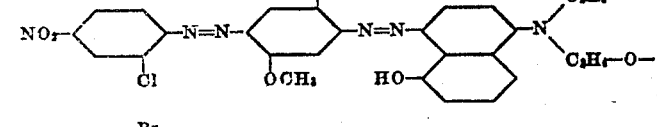 | Do. |
| 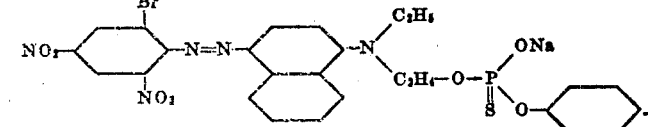 | Blue-green. |
| 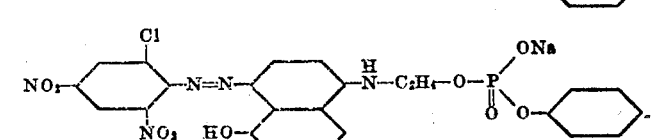 | Red. |

In order that the preparation of the azo compounds of our invention may be clearly understood, the preparation of coupling components having the general formula

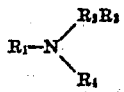

wherein $R_1$ represents the residue of an aryl nucleus of the benzene or naphthalene series, $R_2$ represents an aliphatic radical containing at least two carbon atoms, a cycloalkyl group, an aryl group or a hydroaryl radical, $R_3$ represents a phosphoric acid ester or a thiophosphoric acid ester group and $R_4$ represents hydrogen, an aliphatic group, an aryl group, an aralkyl group, a cycloalkyl group, or an $R_2R_3$ group, wherein $R_2$ and $R_3$ have the meaning previously assigned to them will now be further described. The preparation of certain of these coupling components has already been given.

Coupling components of the above general formula may be prepared by subjecting a compound having the general formula

wherein $R_1$ represents the residue of an aryl nucleus of the benzene or naphthalene series, X represents a hydroxyalkyl group, a hydroxycycloalkyl group, a hydroxyaryl group or a hydroxyhydroaryl group and $R_5$ represents hydrogen, an aliphatic group, an aryl group, an aralkyl group, a cycloalkyl group or X to treatment with a phosphating agent and, depending on the nature of the phosphating agent and the phosphoric or thiophosphoric acid ester group desired, subjecting the compound to hydrolysis or some further treatment. The preparation of compounds having the general formula

is well known and their preparation need not be described.

Suitable phosphating agents include, for example, phosphorus oxychloride, $POCl_3$, phosphorus oxybromide, $POBr_3$, phosphoric acid, $H_3PO_4$, phosphoric anhydride $P_2O_5$, phosphorus sulfochloride, $PSCl_3$, phosphorus sulfobromide, $PSBr_3$, and phosphorus pentasulfide, $P_2S_5$. The use of phosphorus oxychloride and phosphoric acid, for example, is shown in Examples 4 and 6 respectively. Compounds having the general formula

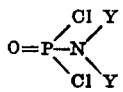

wherein Y represents hydrogen or an alkyl group such as methyl or ethyl may likewise be used as phosphating agents; the use of

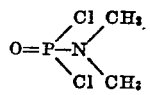

being shown in Example 5.

Similarly, the use of phosphoric anhydride is shown in Example 7. Compounds of the general formula

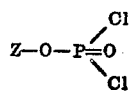

wherein Z is an aryl nucleus, may likewise be employed as phosphating agents and in Examples 8 and 10 the use of

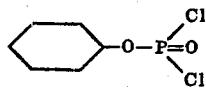

is disclosed. Thiophosphoric compounds corresponding to the phosphoric compounds just given, such as

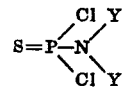

and

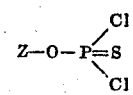

for example, wherein Y and Z have the meaning above assigned to them may likewise be employed as phosphating agents.

Phosphating compounds having the general formula

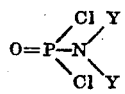

wherein Y represents hydrogen or an alkyl group may be prepared by reacting in equal molar proportions, phosphorus oxychloride with a compound having the general formula

wherein Y represents hydrogen or an alkyl group. Phosphorus oxychloride can be reacted, for example, with ammonia, methylamine, ethylamine, dimethylamine and ethanolamine to obtain

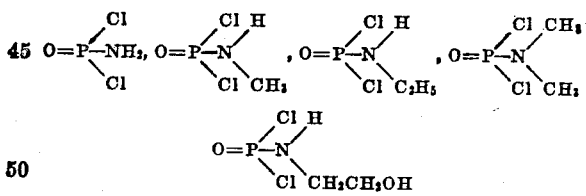

respectively. The corresponding thiophosphoric compounds can be obtained by substituting phosphorus sulfochloride for phosphorus oxychloride.

Phosphating compounds having the general formula

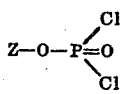

wherein Z is an aryl nucleus, can be prepared by reacting phosphorus oxychloride with a hydroxyaryl compound in equal molar proportions. Suitable hydroxyaryl compounds include phenol and naphthol. By the substitution of a hydroxyalkyl, a hydroxycycloalkyl or a hydroxyaralkyl compound such as methyl alcohol, ethyl alcohol, cyclohexanol and benzyl alcohol for a hydroxyaryl compound, compounds wherein Z is alkyl, cycloalkyl or aralkyl can likewise be prepared. Further, by the substitution of phosphorus sulfochloride for phosphorus oxychloride, the corresponding thiophosphoric compounds can be prepared.

The general method of preparing the phosphating agents will be further clarified by the following examples:

*Preparation of* 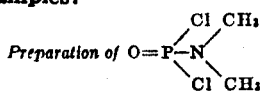

16 grams of phosphorus oxychloride are dissolved in 100 grams of dry pyridine and the resulting solution is cooled to 0° C. 45 grams of dimethylamine dissolved in 50 cc. of cold dry pyridine are then added with stirring and stirring is continued until reaction is complete. The desired compound may be recovered by fractional distillation of the reaction mixture under reduced pressure.

*Preparation of phenyl phosphoryl chloride*

47 grams of phenol, 154 grams of phosphorus oxychloride, and 7.5 grams of magnesium chloride are mixed together and heated on a steam bath for 8 hours, following which the reaction mixture is heated to 110–120° C. for 2½ hours. The reaction mixture is then fractionated under reduced pressure to give a good yield of phenyl phosphoryl chloride boiling at 95–105°/3 mm. Thiophosphoryl chloride can be substituted for phosphorus oxychloride in the above reaction to prepare phenyl thiophosphoryl chloride. Other hydroxy aromatic compounds can be substituted for phenol in the above reaction to obtain various aromatic phosphoryl chlorides.

*Preparation of amyl thiophosphoryl chloride*

85 grams of thiophosphoryl chloride in 50 cc. of chloroform are added to 44 grams of amyl alcohol in 150 cc. of chloroform and the reaction mixture is heated on a steam bath for 12 hours. The chloroform may be removed by distillation under reduced pressure to obtain amyl thiophosphoryl chloride. By the use of 88 grams of amyl alcohol, diamyl thiophosphoryl chloride can be obtained. Similarly, by the use of phosphoryl chloride the corresponding phosphoryl chlorides can be prepared. Again, by the use of an alcohol other than amyl, other thiophosphoryl compounds can be prepared. To illustrate, if ethyl alcohol is used, ethyl thiophosphoryl chloride and diethyl thiophosphoryl chloride can be prepared.

*Preparation of ethylaminophosphoryl chloride*

53 grams of ethylamine hydrochloride is heated with 200 grams of phosphorus oxychloride and the mixture is refluxed for four hours. Any excess phosphorus oxychloride may be removed by distillation. The product obtained has the formula:

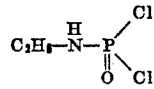

In place of ethylamine, any primary or secondary alkylamine may be used and in place of phosphoryl chloride, thiophosphoryl chloride may be used. If n-propylamine hydrochloride is substituted for ethylamine hydrochloride above, for example, n-propylaminophosphoryl chloride can be obtained. Similarly, if PSCl₃ is substituted for phosphorus oxychloride, ethylaminothiophosphoryl chloride will be obtained.

The azo compounds of our invention which are water-soluble may be employed for the direct coloration of organic derivatives of cellulose, silk and wool or mixtures of these materials without the necessity of using a dispersing or solubilizing agent. The dyeing operations will be conducted in accordance with the usual dyeing practice, salt being added if desired to facilitate exhaustion of the dyebath. For a more detailed description as to how the water-soluble azo dyes of our invention may be employed for the coloration of the above materials, reference may be had to our U. S. Patent No. 2,107,898, issued February 8, 1938. The azo dyes of our invention, which are water-insoluble, or relatively so, will ordinarily be applied to the material to be dyed or colored in the form of an aqueous suspension which can be prepared by grinding the dye to a paste in the presence of soap or other suitable dispersing agent and dispersing the resulting paste in water. For a more detailed description as to how the water-insoluble azo dyes of our invention may be employed for the coloration of the above materials, reference may be had to our U. S. Patent No. 2,108,824, issued February 22, 1938.

It will be noted that while the azo dye compounds of our invention have been illustrated only in connection with compounds having either a phosphoric or a thiophosphoric acid ester group attached thereto in the manner stated, both these groups may be present and azo dye compounds containing both of these groups are included within the scope of our invention. The preparation of these latter compounds is readily apparent from the foregoing description.

We claim:

1. Water-soluble azo dyestuffs of the general formula:

$$A\text{---}N=N\text{---}B$$

wherein A and B stand for radicals of the benzene series, of which B bears the group

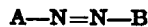
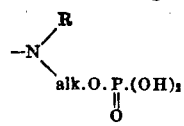

in which R stands for a radical selected from the group consisting of hydrogen and alkyl, and alk. stands for an alkylene radical, these dyestuffs being free from carboxylic acid and sulfonic acid groups, and dyeing cellulose acetate artificial silk various shades of good fastness properties.

2. The azo dyes having the general formula:

$$A\text{---}N=N\text{---}B$$

wherein A stands for a radical of the benzene series and B stands for a member selected from the group consisting of radicals of the benzene and naphthalene series, and in which the radical B bears the group

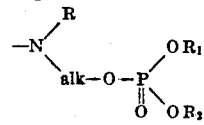

in which R stands for a member selected from the group consisting of hydrogen and alkyl, alk stands for an alkylene radical, R₁ stands for an alkyl group and R₂ stands for a water-soluble salt forming group, these dyes being free from carboxylic acid and sulfonic acid groups.

3. The azo dyes having the general formula:

$$A\text{---}N=N\text{---}B$$

wherein A and B stand for radicals of the benzene series, of which B bears the group

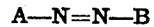
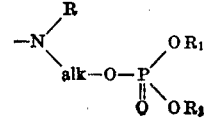

in which R stands for a member selected from the group consisting of hydrogen and alkyl, alk stands for an alkylene radical, R₁ stands for an alkyl group and R₂ stands for a member selected from the group consisting of hydrogen and a water-soluble salt forming group, these dyes being free from carboxylic acid and sulfonic acid groups.

4. The azo dyes having the general formula:

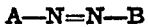

wherein A and B stand for radicals of the benzene series, of which B bears the group

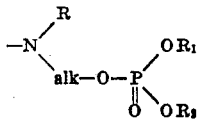

in which R stands for alkyl, alk stands for an alkylene radical, R₁ stands for an alkyl group and R₂ stands for a member selected from the group consisting of hydrogen and a water-soluble salt forming group, these dyes being free from carboxylic acid and sulfonic acid groups.

5. Cellulose ester or ether materials colored with an azo dye having the general formula:

wherein A stands for a radical of the benzene series and B stands for a member selected from the group consisting of radicals of the benzene and naphthalene series and in which the radical B bears the group

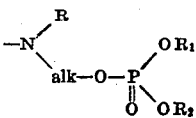

in which R stands for a member consisting of hydrogen and alkyl, alk stands for an alkylene radical, R₁ stands for an alkyl group and R₂ stands for a water-soluble salt forming group, these dyes being free from carboxylic acid and sulfonic acid groups.

6. Cellulose acetate materials colored with an azo dye having the general formula:

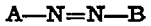

wherein A and B stand for radicals of the benzene series, of which B bears the group

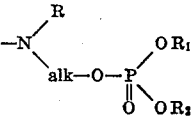

in which R stands for a member selected from the group consisting of hydrogen and alkyl, alk stands for an alkylene radical, R₁ stands for an alkyl group and R₂ stands for a water-soluble salt forming group, these dyes being free from carboxylic acid and sulfonic acid groups.

7. The azo dye compounds having the formula:

wherein A—N=N— stands for the residue of a member selected from the group consisting of a diazotized aromatic amine and a diazotized aminoazobenzene, B stands for the residue of a member selected from the group consisting of a benzene coupling component and a naphthalene coupling component, X stands for a member selected from the group consisting of an alkylene radical containing at least two carbon atoms, a cyclohexyl radical and a phenyl group, said member X being joined directly to a nitrogen atom which is a nuclear substituent of the member B and Y stands for a member selected from the group consisting of a phosphoric acid ester group and a thiophosphoric acid ester group.

8. The azo dye compounds having the formula:

wherein A—N=N— stands for the residue of a diazotized monocyclic aminobenzene, B stands for the residue of a member selected from the group consisting of a benzene coupling component and a naphthalene coupling component, X stands for an alkylene radical containing at least two carbon atoms joined directly to a nitrogen atom which is a nuclear substituent of the member B and Y stands for a member selected from the group consisting of a phosphoric acid ester group and a thiophosphoric acid ester group.

9. The azo dye compounds having the formula:

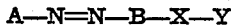

wherein A—N=N— stands for the residue of a diazotized aromatic amine, B stands for the residue of a member selected from the group consisting of a benzene coupling component and a naphthalene coupling component, X stands for an alkylene radical containing at least two carbon atoms joined directly to a nitrogen atom which is a nuclear substituent of the member B and Y stands for a member selected from the group consisting of a phosphoric acid ester group and a thiophosphoric acid ester group.

10. The azo dye compounds having the formula:

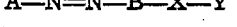

wherein A—N=N— stands for the residue of a diazotized monocyclic aminobenzene, B stands for the residue of a benzene coupling component, X stands for an alkylene radical containing at least two carbon atoms joined directly to a nitrogen atom which is a nuclear substituent of the member B and Y stands for a phosphoric acid ester group.

11. The azo dye compounds having the formula:

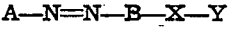

wherein A—N=N— stands for the residue of a diazotized monocyclic aminobenzene, B stands for the residue of a benzene coupling component, X stands for an alkylene radical containing at least two carbon atoms joined directly to a nitrogen atom which is a nuclear substituent of the member B and Y stands for a thiophosphoric acid ester group.

12. The azo dye compounds having the formula:

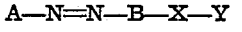

wherein A—N=N— stands for the residue of a diazotized monocyclic aminobenzene, B stands for the residue of a naphthalene coupling component, X stands for an alkylene radical containing at least two carbon atoms joined directly to a nitrogen atom which is a nuclear substituent of the member B and Y stands for a member selected from the group consisting of a phosphoric acid ester group and a thiophosphoric acid ester group.

JAMES G. McNALLY.
JOSEPH B. DICKEY.

Certificate of Correction

Patent No. 2,328,570.  September 7, 1943

JAMES G. McNALLY ET AL.

It is hereby certified that errors appear in the printed specification of the above numbered patent requiring correction as follows: Page 4, first column, line 61, before "by" insert *are given*; page 6, first column, line 67, for that portion of the formula reading "CH₃CH₂CH₂" read *CH₃CH₂CH₃*; page 8, in the tabulation, Coupling component 4, for 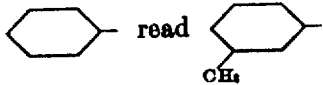

and that the said Letters Patent should be read with these corrections therein that the same may conform to the record of the case in the Patent Office.

Signed and sealed this 15th day of February, A.D. 1944.

[SEAL]

HENRY VAN ARSDALE,
*Acting Commissioner of Patents.*